United States Patent [19]
Johnson et al.

[11] Patent Number: 5,237,700
[45] Date of Patent: Aug. 17, 1993

[54] EXCEPTION HANDLING PROCESSOR FOR HANDLING FIRST AND SECOND LEVEL EXCEPTIONS WITH REDUCED EXCEPTION LATENCY

[75] Inventors: William M. Johnson; Michael D. Goddard; Tim Olson, all of Austin, Tex.

[73] Assignee: Advanced Micro Devices, Inc., Sunnyvale, Calif.

[21] Appl. No.: 496,762

[22] Filed: Mar. 21, 1990

[51] Int. Cl.⁵ .......................... G06F 9/30; G06F 9/42; G06F 9/46; G06F 13/18

[52] U.S. Cl. ............................ 395/775; 364/229.5; 364/241.2; 364/243.45; 364/242.1; 364/241.5; 364/241.6; 364/242.5; 364/246.2; 364/259.7; 364/259.5; 364/259.8; 364/259.6; 364/261.3; 364/261.4; 364/261.5; 364/DIG. 1

[58] Field of Search ............... 395/800, 325, 375, 650, 395/400, 425, 725, 775

[56] References Cited

U.S. PATENT DOCUMENTS

| | | | |
|---|---|---|---|
| 4,631,659 | 12/1986 | Hayn, II et al. | 395/325 |
| 4,809,157 | 2/1989 | Eilert et al. | 395/650 |
| 4,992,934 | 2/1991 | Portanova et al. | 395/375 |
| 5,095,426 | 3/1992 | Senta | 395/375 |

FOREIGN PATENT DOCUMENTS 1495729 12/1977 United Kingdom .

OTHER PUBLICATIONS

J. A. Smith, et al., Implementing Precise Interrupts In Pipelined Processors, *IEEE Transactions On Computers*, 37:562-573 (1988).

C. Melear, The Design of the 88000 RISC Family, *IEEE Micro*, 9:26-38 (1989).

*Primary Examiner*—Thomas C. Lee
*Assistant Examiner*—Daniel H. Pan
*Attorney, Agent, or Firm*—Foley & Lardner

[57] ABSTRACT

A processor having improved exception handling capability handles second level exceptions with reduced exception latency. The processor processes instructions in order through a plurality of serial stages. A first set of registers continuously tracks each instruction as it advances from stage to stage. An exception handles processes first level exception conditions and precludes updating of the first set of registers when it processes first level exception conditions to permit the processor to restart at the point of a first level exception condition. A second set of registers continuously tracks the instruction in tandem with the first set of registers, but is updatable during the processing of first level exception conditions by the exception handles. A monitor processes second level exception conditions occurring in the exception handler and precludes the second set of registers from being updated when it processes the second level exception conditions to permit the exception handler to restart from the point of the occurrence of a second level exception condition.

15 Claims, 1 Drawing Sheet

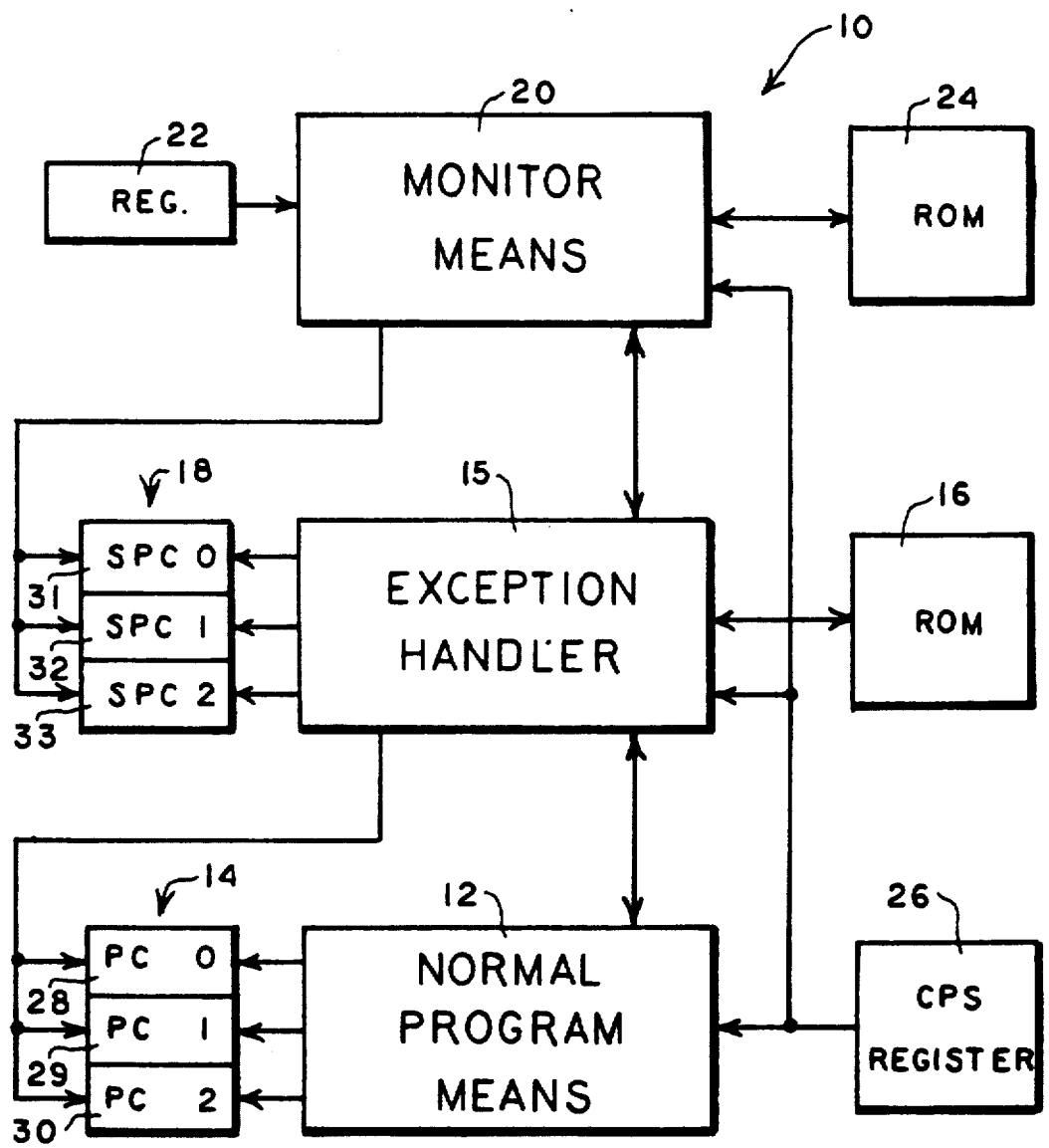

EXCEPTION HANDLING PROCESSOR FOR HANDLING FIRST AND SECOND LEVEL EXCEPTIONS WITH REDUCED EXCEPTION LATENCY

BACKGROUND OF THE INVENTION

The present invention generally relates to an improved processor. The present invention more particularly relates to such a processor which is capable of more efficiently handling second level exception conditions.

Microprocessors are well known in the art. One type of processor is a reduced instruction set (RISC) processor having a pipelined architecture. Such processors process serial instructions through a series of stages including, for example, a fetch stage, a decode stage, an execute stage and a write-back stage. Such processors operate at very high speeds and due to their pipelined architecture, are capable of efficiently executing instructions with a minimum of hardware.

In such processors, each instruction is processed through the aforementioned stages. Hence, during one cycle, a first instruction will be in the write-back stage, a second instruction will be in the execute stage, a third instruction will be in the decode stage, and a fourth instruction will be in the fetch stage. In the immediately succeeding cycle, the second instruction will be in the write-back stage, the third instruction will be in the execute stage, the fourth instruction will be in the decode stage, and a new or fifth instruction will be in the fetch stage.

Such processors also generally include an exception handler. Exception handlers are also well known in the art. The exception handlers are utilized in such processors to process non-routine instructions. Non-routine instructions invoke in the processor what is known as an exception condition. Exception conditions may arise, for example, when an instruction calls for an invalid operation, when an instruction calls for a division by zero, or when the execution of an instruction will cause an overflow or underflow condition.

When an exception condition is noted during the execution of an instruction, normal processing is interrupted and the processor must save the context of the interrupted process by noting the process status of each instruction currently in process. The exception handler must then invoke a software routine to determine the cause of the exception condition and process the exception condition by performing any functions the exception requires. After the exception condition is handled, the processor must then return to the normal process for each instruction which was being processed, at the process point for each such instruction when the exception condition occurred.

Prior art processors, upon detecting an exception condition, have saved the context of the interrupted process by storing the same in external memory. Storing the context of the interrupted process in external memory causes a problem in the form of increased exception latency because it increases the time required from receipt of an exception to the execution of the exception by the exception handler. This is especially the case if memory access times are long compared to processor register access times.

To overcome the exception latency problem, one prior art processor continuously saves its context in internal registers which are prevented from being updated upon the detection of an exception. The exception handler can then execute the exception directly because the processor context is frozen in the internal registers.

While the internal register approach has reduced exception latency, the exception handler is only capable of executing first level exceptions, exceptions occurring in the normal process. Unfortunately, at times, exceptions can occur during the execution of an exception itself. These exceptions are referred to as second level exceptions and cannot be handled by such processors unless specialized first level exception handler software is provided. Standard exception handling tools such as setting break points and tracing program flow cannot be used since exceptions are disabled during the execution of first level exceptions in such processors. As a result, second level exceptions are either not detected or are ignored altogether.

The present invention overcomes the aforementioned problems in handling exceptions. It not only provides a means by which second level exceptions can be efficiently executed but also, avoids the problems of exception latency.

SUMMARY OF THE INVENTION

The present invention therefore provides an improved processor including normal program means for serially processing instructions in order through a plurality of serial stages. The processor further includes first means coupled to the normal program means for tracking each instruction in process according to its respective process stage and is updatable as each instruction being processed advances to the next stage. The processor further includes exception handler means coupled to the normal program means for processing first level exception processing instructions through the plurality of stages for processing first level exception conditions occurring in the normal program means. The exception handler means is also coupled to the first means to preclude the first means from being updated when the exception handler means processes the first level exception conditions to permit the normal program means to restart the processing of the instructions in process from the point of occurrence of the first level exception condition after the processing of a first level exception condition is completed. The processor further includes second means coupled to the exception handler means for tracking, in tandem with the first means, each instruction in process in the normal program means according to its respective process stage. The second means is updatable in tandem with the first means and is also updatable during the processing of a first level exception condition by the exception handler means for tracking each first level exception processing instruction in process according to its respective process stage. The processor further includes monitor means coupled to the exception handler means for processing second level exception processing instructions for processing second level exception conditions occurring in the exception handler means. The monitor means is coupled to the second means to preclude the second means from being updated when the monitor means processes the second level exception conditions to permit the exception handler means to restart the processing of the first level exception processing instructions in process from the point of the occurrence of the second level exception condition after the processing of a second level exception condition is completed.

BRIEF DESCRIPTION OF THE DRAWING

The features of the present invention which are considered to be novel are set forth with particularity in the appended claims. The invention, together with further advantages and objects thereof, may best be understood by making reference to the following description taken in conjunction with the accompanying drawing, in the sole FIGURE of which like reference characters identify identical elements, and wherein the sole FIGURE is a schematic block diagram of an improved processor employing an improved exception handling means embodying the present invention.

DESCRIPTION OF THE PREFERRED EMBODIMENT

Referring now to the sole FIGURE, it illustrates in block diagram form, a processor which employs an improved exception handling means embodying the present invention. The processor 10 generally includes a normal program means 12, a first plurality of registers 14, an exception handler 15, a read-only memory 16, a second plurality of registers 18, a monitor means 20, a third register 22, a second read-only memory 24, and a current processor state register 26.

The normal program means 12, in a manner well known in the art, processes normal program instructions serially and in order through a plurality of serial stages. Preferably, the serial stages includes a fetch stage, a decode stage, an execute stage, and a write-back stage. The normal program instructions are obtained from internal memory (not shown) with each normal program instruction being stored in memory at a respective unique address. The normal program means 12 is coupled to the first plurality of registers 14 which includes registers 28, 29 and 30. The registers 28, 29 and 30 may comprise program counters PC 0, PC 1 and PC 2 respectively.

The first plurality of registers 28 through 30 track each normal program instruction in process according to its respective process stage. To that end, register 28 is dedicated for storing the address of the instruction currently in the decode stage, register 29 is dedicated for storing the address of the normal program instruction currently in the execute stage, and register 30 is dedicated for storing the address of the normal program instruction currently in the write-back stage. The registers 28 through 30 are continuously updated by the normal program means as each instruction being processed advances to the next process stage.

As can be seen in the sole figure, the normal program means 12 is coupled to the exception handler 15. The exception handler is arranged to process first level processing instructions through the plurality of process stages for processing first level exception conditions occurring in the normal program means in a manner well known in the art. The exception handler 15 processes first level processing instructions obtained from the read-only memory 16. The exception handler 15 is also coupled to each of the first plurality of registers 28 through 30 to preclude these registers from being updated when an exception condition is detected and during the time in which the exception handler 15 processes the first level exception conditions. The freezing of the first plurality of registers 28 through 30 permits the normal programming means to restart the processing of the normal program instructions in process from the point of the occurrence of the first level exception condition after the processing of the first level exception condition is completed by the exception handler 15.

The exception handler 15 is also coupled to the second plurality of registers 18 which includes registers 31, 32 and 33. The registers 31, 32 and 33 may comprise shadow program counters SPC 0, SPC 1 and SPC 2 respectively. The second plurality of registers 31 through 33 are identical to the first plurality of registers 28 through 30 and track, in tandem with the first plurality of registers, each normal program instruction in process in the normal program means. As a result, register 31 is dedicated for storing the address of the normal program instruction currently in the decode stage, register 32 is dedicated for storing the address of the normal program instruction currently in the execute stage, and register 33 is dedicated for storing the address of the normal program instruction currently in the write-back stage. As a result, the second set of registers 31 through 33 are updatable in tandem with the first plurality of registers 28 through 30.

Unlike the first plurality of registers 28 through 30, the second plurality of registers 31 through 33 are also updatable by the exception handler 15 during the processing of first level exception condition instructions as the exception handler 15 processes first level exception conditions. As a result, while the first plurality of registers 14 are frozen when the exception handler 15 processes a first level exception condition, the register 31 will store the address of the first level exception processing instruction currently in the decode stage, the register 32 will store the address of the first level exception processing instruction currently in the execute stage, and the register 33 will store the address of the first level exception processing instruction currently in the write-back stage. As a result, the second plurality of registers 18 are continuously updated by the exception handler when the exception handler processes first level exception conditions.

The monitor means 20 is coupled to the exception handler 15. The monitor means 20 is arranged for processing second level exception processing instructions for processing second level exception conditions occurring in the exception handler 15. As previously mentioned, second level exceptions are exceptions which occur in the exception handler 15 itself while it is handling a first level exception. The monitor means 20 is also coupled to the second plurality of registers 18 to preclude the second plurality of registers 18 from being updated when a second level exception condition is detected and during the time in which the monitor means is processing the second level exception condition. This permits the exception handler 15 to restart the processing of the first level exception processing instructions in process from the point of the occurrence of the second level exception condition after the processing of the second level exception condition is completed.

As will be appreciated by those skilled in the art, one of the possible problems that could be encountered during the second level exception handling is a misplaced or incorrect vector-table entry. Because of this, and to isolate the second level exception condition processing to one specific handler, the monitor means is activated at one fixed location, rather than jumping to one of many different exception-specific handlers. The monitor means 20 is preferably arranged to be activated for all possible second level exception conditions. In order to determine the cause of the second level exception condition, the register 22 is provided with a multiple-bit binary word representing the cause of the second level exception condition. The register 22, herein referred to as the reason vector register, is coupled to the monitor means 20 for providing the monitor means 20 with the multiple-bit binary word entered therein to inform the monitor means 20 as to the cause of the second level exception condition.

The monitor means 20 processes the second level exception processing instructions obtained from the read-only memory 24. It accesses the read-only memory 24 to obtain the second level exception processing instructions responsive to the multiple-bit word contained in the reason vector register 22.

The current processor state register 26 is coupled to the normal program means 12, the exception handler 15 and the monitor means 20. It is used to store a multiple-bit word indicative of the current state of the processor 10. The multiple-bit word stored within the register 26 includes an exception handler bit which is set when the exception handler processes a first level exception condition. The exception handler bit, when set, causes the exception handler 14 to preclude further updating of the first plurality of registers 14. As a result, the registers 14 are responsive to the exception handler bit being set to preclude further updating of the first plurality of registers 14.

The multiple-bit word stored in the register 26 further includes a monitor mode bit which is set upon the occurrence of a second level exception condition. The monitor mode bit, when set, informs the normal program means 12 and the exception handler 15 that the monitor means 20 is in the process of handling a second level exception condition.

The multiple-bit word stored in the register 26 also includes a freeze-bit which is set when the monitor means 20 processes a second level exception condition. When the freeze-bit is set, the monitor means 20 is caused to preclude the second plurality of registers 18 from being updated. As a result, the second plurality of registers 18 are responsive to the freeze-bit being set to preclude further updates of the second plurality of registers 18.

When the monitor means 20 has completed the processing of a second level condition, it will obtain from the read-only memory 24 an interrupt return instruction. This instruction will cause the monitor means to permit the second plurality of registers 18 to once again be updated and the exception handler to resume the processing of the first level exception at the instruction addresses contained in the second plurality of registers 18. Similarly, when the exception handler 15 completes its processing of a first level exception condition, it will cause the first plurality of registers 14 to be once again updated and the normal program means to restart the processing of the normal program instruction addresses stored in the first plurality of registers 14. Hence, the processor 10 embodying the present invention is capable of processing second level exception conditions. In addition, the processor 10 is capable of processing second level exception conditions while avoiding exception latency since the addresses of the instructions in process are immediately available in the internal registers.

From the foregoing, it can be seen that the present invention provides a processor having improved exception handling capability. As will be appreciated by those skilled in the art, by virtue of the monitor means 20, first level exception handlers can be debugged just like any other user-written software routine. To that end, a breakpoint can be placed in a first level interrupt handler and will cause activation of the monitor means when the breakpoint is reached. Trace traps can also force activation of the monitor means so that a first level exception handler can be single-stepped.

A further advantage of the present invention is that the monitor means 20 provides enhanced error detection. In prior art processors, most instructions which cause exceptions were ignored when the processor was in a first level exception processing condition. By virtue of the present invention, such exceptions would cause activation of the monitor means allowing these errors to be detected.

In addition to the foregoing, the present invention allows for double-fault recovery. An exception that occurs during the context save of a previous exception is called a double-fault. Prior art processors either did not detect double-faults, or could not recover from them. Such failure resulted because the state of the first exception was not completely saved. By virtue of the present invention, the process state is continuously saved and frozen when either a first level exception condition or a second level exception condition occurs. As a result, double-faults are fully recoverable.

While a particular embodiment of the present invention has been shown and described, modifications may be made, and it is therefore intended to cover in the appended claims all such changes and modifications which fall within the true spirit and scope of the invention.

What is claimed is:

1. An improved processor comprising:
    normal program means for serially processing instructions in order through a plurality of serial stages;
    first means coupled to said normal program means for tracking each instruction in process according to its respective process stage, said first means being updatable as each said instruction being processed advances to the next said stage;
    exception handler means coupled to said normal program means for processing first level exception processing instructions through said plurality of stages for processing first level exception conditions occurring in said normal program means, said exception handler means also being coupled to said first means to preclude said first means from being updated when said exception handler means processes said first level exception conditions to permit said normal program means to restart the processing of said instructions in process from the point of the occurrence of said first level exception condition after the processing of a first level exception condition is completed;
    second means coupled to said exception handler means for tracking, in tandem with said first means, each instruction in process in said normal program means according to its respective process stage, said second means being updatable in tandem with said first means, and said second means also being updatable during the processing of a first level exception condition by said exception handler means for tracking each said first level exception processing instruction in process according to its respective process stage; and monitor means coupled to said exception handler means for processing second level exception processing instructions for processing second level exception conditions occurring in said exception handler means, said monitor means also being coupled to said second means to preclude said second means from being updated when said monitor means processes said second level exception conditions to permit said exception handler means to restart the processing of said first level exception processing instructions in process from the point of the occurrence of said second level exception condition after the processing of a second level exception condition is completed.

2. A processor as defined in claim 1 wherein said plurality of serial stages includes fetch, decode, execute and write-back stages.

3. A processor as defined in claim 2 wherein said first means comprises a first set of registers.

4. A processor as defined in claim 3 wherein said first set of registers include decode, execute, and write-back registers for storing an address of each instruction in process according to its respective process stage.

5. A processor as defined in claim 4 wherein said second means comprises a second set of registers.

6. A processor as defined in claim 5 wherein said second set of registers include decode, execute, and write-back registers for also storing an address of each instruction in process according to its respective process stage.

7. A processor as defined in claim 6 further including storage means coupled to said monitor means for providing said monitor means with said second level exception processing instructions.

8. A processor as defined in claim 6 further including storage means for storing a multiple-bit word indicative of the current state of said processor, said storage means being coupled to said normal program means, said exception handler, and said monitor means.

9. A processor as defined in claim 8 wherein said multiple-bit word includes an exception handler bit, said exception handler bit being set when said exception handler processes a first level exception condition and wherein said first set of registers are responsive to said exception handler bit being set to preclude further updating thereof.

10. A processor as defined in claim 9 wherein said multiple-bit word further includes a monitor mode bit, said monitor mode bit being set upon the occurrence of a second level exception condition.

11. A processor as defined in claim 10 wherein said multiple-bit word further includes a freeze bit, wherein said freeze bit is set when said monitor means processes a second level exception condition, and wherein said second set of registers are responsive to said freeze bit being set to preclude further updating thereof.

12. A processor as defined in claim 7 wherein said storage means is a read-only memory.

13. A processor as defined in claim 7 further including a third register coupled to said monitor means for storing a multiple-bit word indicative of the cause of said second level exception condition and for providing said monitor means with said multiple-bit word.

14. A processor as defined in claim 7 wherein said monitor means is arranged to obtain said second level exception processing instructions from said storage means responsive to said multiple-bit word.

15. An improved processor comprising:
normal program means for serially processing instructions in order through serial fetch, decode, execute, and write-back stages;
a first set of decode, execute and write-back program registers coupled to said normal program means for storing the address of each instruction in process according to its respective process stage, said registers being updatable as each said instruction being processed advances to the next said stage;
exception handler means coupled to said normal program means for processing first level exception processing instructions through said fetch, decode, execute, and write-back stages for processing first level exception conditions occurring in said normal program means, said exception handler means also being coupled to said first set of decode, execute, and write-back registers to preclude said first set of registers from being updated when said exception handler means processes said first level exception condition to permit said normal program means to restart the processing of said instructions in process from the point of the occurrence of said first level exception condition after the processing of a first level exception condition is completed;
a second set of decode, execute and write-back registers coupled to said exception handler means for storing, in tandem with said first set of registers, the address of each instruction in process in said normal program means according to its respective process stage, said second set of registers being updatable in tandem, with said first set of registers, and said second set of registers also being updatable during the processing of a first level exception condition by said exception handler means for storing the address of each said first level exception processing instruction in process according to its respective process stage; and
monitor means coupled to said exception handler means for processing second level exception processing instructions for processing second level exception conditions occurring in said exception handler means, said monitor means also being coupled to said second set of decode, execute and write-back registers to preclude said second set of registers from being updated when said monitor means processes said second level exception conditions to permit said exception handler means to restart the processing od said first level exception processing instructions in process from the point of the occurrence of said second level exception condition after the processing of a second level exception condition is completed.

* * * * *